United States Patent [19]

Kim

[11] Patent Number: 5,396,550
[45] Date of Patent: Mar. 7, 1995

[54] RADIO AND LAND-LINE TELEPHONES WITH HANDS-FREE OPERATION

[75] Inventor: Kyoung-Jun Kim, Incheon, Rep. of Korea

[73] Assignee: SamSung Electronics Co., Ltd., Suwon, Rep. of Korea

[21] Appl. No.: 812,164

[22] Filed: Dec. 23, 1991

[30] Foreign Application Priority Data

May 27, 1991 [KR] Rep. of Korea ............... 1991-8595

[51] Int. Cl.$^6$ ............................................. H04M 1/00
[52] U.S. Cl. .................................. 379/390; 379/389; 379/420
[58] Field of Search ................... 379/389, 390, 420; 455/79, 78, 83, 84, 222, 223

[56] References Cited

U.S. PATENT DOCUMENTS

3,889,059  6/1975  Thompson et al. ............ 379/395 X
4,700,382  10/1987 Means et al. ..................... 379/390

Primary Examiner—James L. Dwyer
Assistant Examiner—Paul A. Fournier
Attorney, Agent, or Firm—Robert E. Bushnell

[57] ABSTRACT

Disclosed are hands-free land-line and radio telephones comprising a public telecommunication network connection part for transmitting a signal from the transmission signal input terminal to the public telecommunication network connection terminal and a reception signal from the public telecommunication network connection terminal to the reception signal output terminal, a first voltage controlled attenuator for controlling an output of the microphone by a given loss corresponding to a first control voltage level, a second voltage controlled attenuator for controlling a reception signal by a given loss corresponding to a second control voltage input level, a first detection circuit for generating a rectified voltage proportional to a magnitude of an input audio signal by rectifying an output signal of the microphone, a second detection circuit for generating a rectified voltage proportional to a magnitude of an input audio signal by rectifying an output signal of the reception signal output terminal, a control voltage output means for generating a gradient voltage signal corresponding to the difference of a transmission signal and a reception signal, and an inverting amplifier for inverting an output of the control voltage output means, wherein attenuation rates of the first and the second voltage controlled attenuators are controlled automatically in a complementary fashion, by the difference between a transmission signal and a reception signal.

26 Claims, 4 Drawing Sheets

RADIO AND LAND-LINE TELEPHONES WITH HANDS-FREE OPERATION

FIELD OF THE INVENTION

This invention relates to land-line and radio telephone systems and more particularly to land-line and telephone systems with circuitry for providing an exact hands-free operation to a user in spite of a high level of ambient background noise.

TECHNICAL BACKGROUND OF THE INVENTION

In both systems of land-line and radio telephones, a user communicates by means of a handset having a speaker at its one end to be placed close to the user's ear and a microphone at its other end to be applied to the user's mouth. Thus, only one hand of the user is free since the other hand of the user must be used to hold the handset. A speaker phone has been developed in order to provide the user with hands-free operation. The speakerphone is generally coupled to a telephone line and designed for the user to be able to move freely while communicating with another party. The speakerphone is generally used to compare the volume of two users and select the larger one of the two volumes, and such a conventional speaker phone is well operated on a land-line telephone system but may not be operated correctly on a radio telephone system in a high level of ambient background noise such as in a vehicle. For example, the speakerphone in the high level of ambient background noise has a possibility to always select an audio sound from the hands-free party and block all communication signals from the other party.

Figure 1:
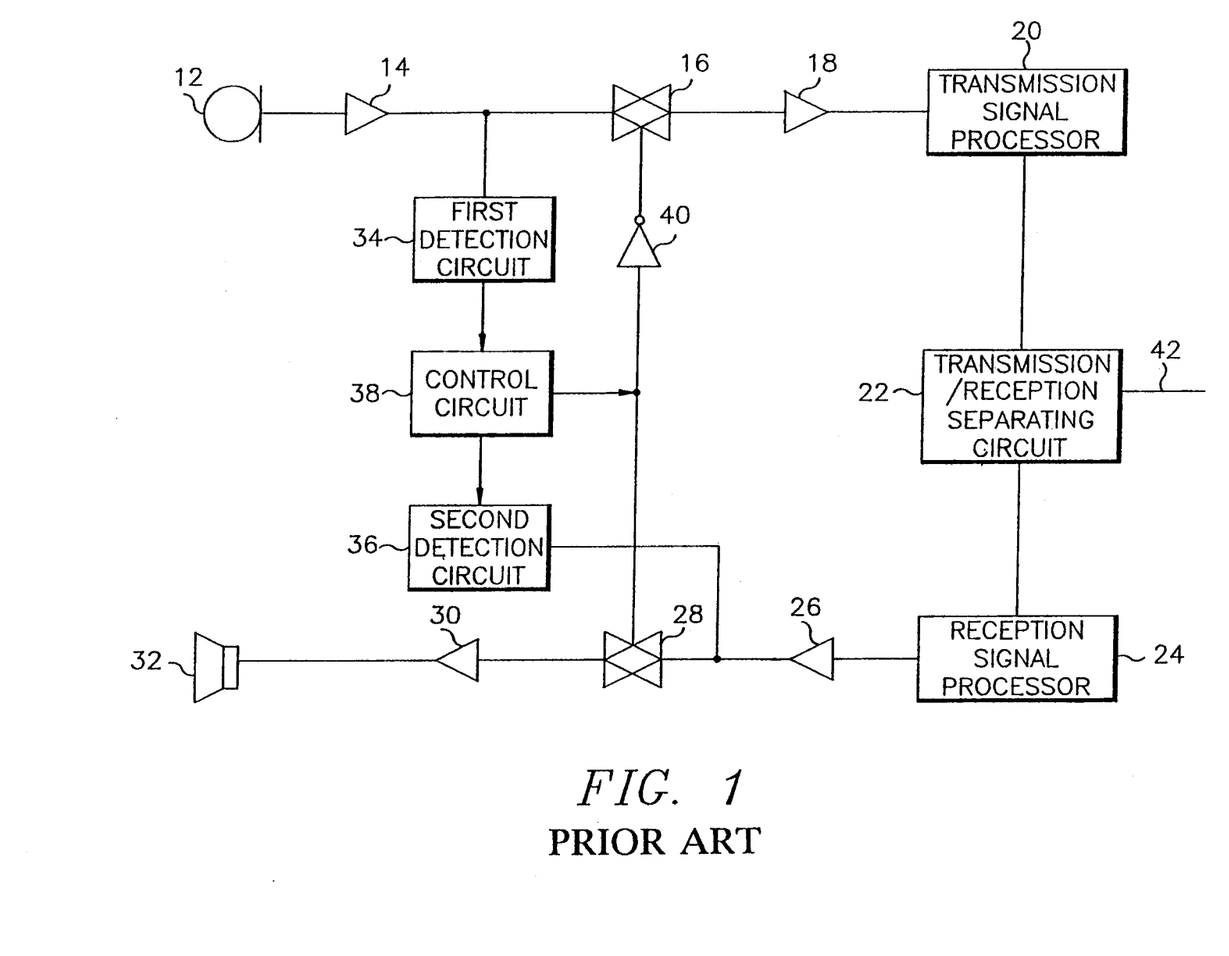
FIG. 1 shows a hands-free control circuit of a conventional hands-free radio telephone.

As shown in FIG. 1, a circuit of a conventional hands-free radio telephone is introduced for solving such a problem as blocking communications in a high level of ambient background noise. The circuit was applied to the patent office of the Republic of Korea for a patent by a semiconductor manufacturer, Motorola Co. of the U.S.A. on Mar. 25, 1982 and granted with the patent No. 88-1016 published in the patent gazette No. 1406 of Jun. 13, 1988.

Referring to FIG. 1, the circuitry comprises a microphone 12 to convert an audio signal into an electric signal, a speaker 32 to convert an electric signal into an audio signal, a plurality of amplifiers 14, 18, 26, and 30 to process the electric signal with a given value in order to connect them with a public telecommunication network, a first detection circuit 34 to detect the presence of a signal from the microphone 12, a second detection circuit 36 to detect the presence of a signal from the public telecommunication network, a control circuit 38 to generate a control signal for switching a transmission path and/or a reception path of outputs of the first and/or the second detection circuits 34, 36, audio switches 16, 28 to transmit or block the audio signal according to the control signal, a transmission signal processor 20 to process the signal from the microphone 12 passed through the amplifier 14, the audio switch 16 and the amplifier 18 for connecting them with the public telecommunication network, a transmission/reception separating circuit 22 to connect the transmission and the reception signals with a public telecommunication network, and a reception signal processor 24 to suitably treat the reception signal separated from the transmission/reception separating circuit 22 and transmit the resultant signal to the reception path.

All the details of the circuit described on the patent No. 88-1016 in the patent gazette No. 1406 will be summarized as follows. An electric audio signal generated from a microphone 12 is passed through an amplifier 14 and transmitted to a first detection circuit 34 and an audio switch 16. On the other hand, a reception signal from a public telecommunication network 42 is passed through a transmission/reception separating circuit 22 and a reception signal processor 24, and amplified to a given level by an amplifier 26. The amplified signal from the amplifier 26 is transmitted to a second detection circuit 36 and an audio switch 28. The first detection circuit 34 has a first predetermined state in the presence of the audio signal and a second predetermined state in the absence of the audio signal by detecting the signals from the microphone 12. And the second detection circuit 36 has the first predetermined state in the presence of the audio signal and the second predetermined state in the absence of the audio signal by detecting the reception signals from the public telecommunication network 42. A control circuit 38 generates a control signal of the first predetermined state in the presence of the reception signal and the second predetermined state in the presence of the transmission signal by examining the signals from the first and the second detection circuits 34, 36. A reception audio switch 28 is closed to pass the reception audio signal and the transmission audio switch 16 is opened by an inverting gate 40 to block the transmission of an audio signal in the presence of the control signal of the first predetermined state from the control circuit 38. On the contrary, the transmission audio switch 16 is closed to pass the transmission audio signal and the reception audio switch 28 is opened to interrupt the reception audio signal, in the presence of the control signal of the second predetermined state from the control circuit 38. On account of the audio switches 16, 28 of the conventional circuit as shown in FIG. 1 being able to do only two actions of closing and opening, the audio switches 16, 28 make some syllables intermittent and do not bring about a smooth communication when two users speak simultaneously or they are in an ambient background noise, and therefore it is very difficult to maintain the performance when applying the circuit to land-line and radio telephone systems. In the conventional circuit as described above, it is impossible to perform a full duplex communication because the control circuit 38 is activated to close one audio switch 16 (or 28) and open simultaneously the other audio switch 28 (or 16) for transmitting a certain audio signal to a certain path.

SUMMARY OF THE INVENTION

An object of the invention is to provide hands-free radio and land-line telephones to maintain a speech path of a high quality call between two users in a high level of ambient background noise.

Another object of the invention is to provide an improved hands-free speaking circuit to make both users have hands free operation and a full duplex audio communication possible.

Still another object of the invention is to provide a control circuit for controlling gains of transmission and reception signals according to a level of an output audio signal of a microphone, an ambient noise signal and a reception signal, and thereby preventing a howling.

According to the present invention, there is provided hands-free radio and land-line telephones comprising:

(a) a microphone for converting an audio signal into an electric signal;

(b) a speaker for converting an electric signal into an audio signal;

(c) a public telecommunication network connection part installed between a public telecommunication network connection terminal, a transmission signal input terminal and a reception signal output terminal to transmit a signal from the transmission signal input terminal to the public telecommunication network connection terminal and to transmit a reception signal from the public telecommunication network connection terminal to the reception signal output terminal;

(d) a first voltage controlled attenuator installed between the microphone and the transmission signal input terminal to control an output of the microphone by a gain corresponding to a first control voltage level;

(e) a second voltage controlled attenuator installed between the speaker and the reception signal output terminal to control the reception signal by a gain corresponding to a second control voltage input level;

(f) a first detection circuit for generating a rectified voltage proportional to a magnitude of an input audio signal by rectifying the output signal of the microphone;

(g) a second detection circuit for generating a rectified voltage proportional to a magnitude of an input audio signal by rectifying an output signal of the reception signal output terminal;

(h) a control voltage output means for comparing and amplifying the outputs from the first and the second detection circuits so as to generate a gradient voltage signal smaller than a given voltage corresponding to the difference of the transmission and the reception signals in case of the transmission signal being larger than the reception signal and vice versa, larger than a given voltage in case of the transmission signal being smaller than the reception signal, and to supply the gradient voltage signal to the second voltage controlled attenuator; and (i) an inverting amplifier for inverting an output of the control voltage output means transmitted to the first voltage controlled attenuator so that attenuation rates of the first and the second voltage controlled attenuators are controlled automatically according to the amount of the difference between the transmission and the reception signals.

BRIEF DESCRIPTION OF DRAWINGS

The advantages and features of the present invention will become more apparent by describing in detail the preferred embodiment of the present invention with the reference to the attached drawings, in which.

DETAILED DESCRIPTION OF CERTAIN EMBODIMENT

Figure 2:
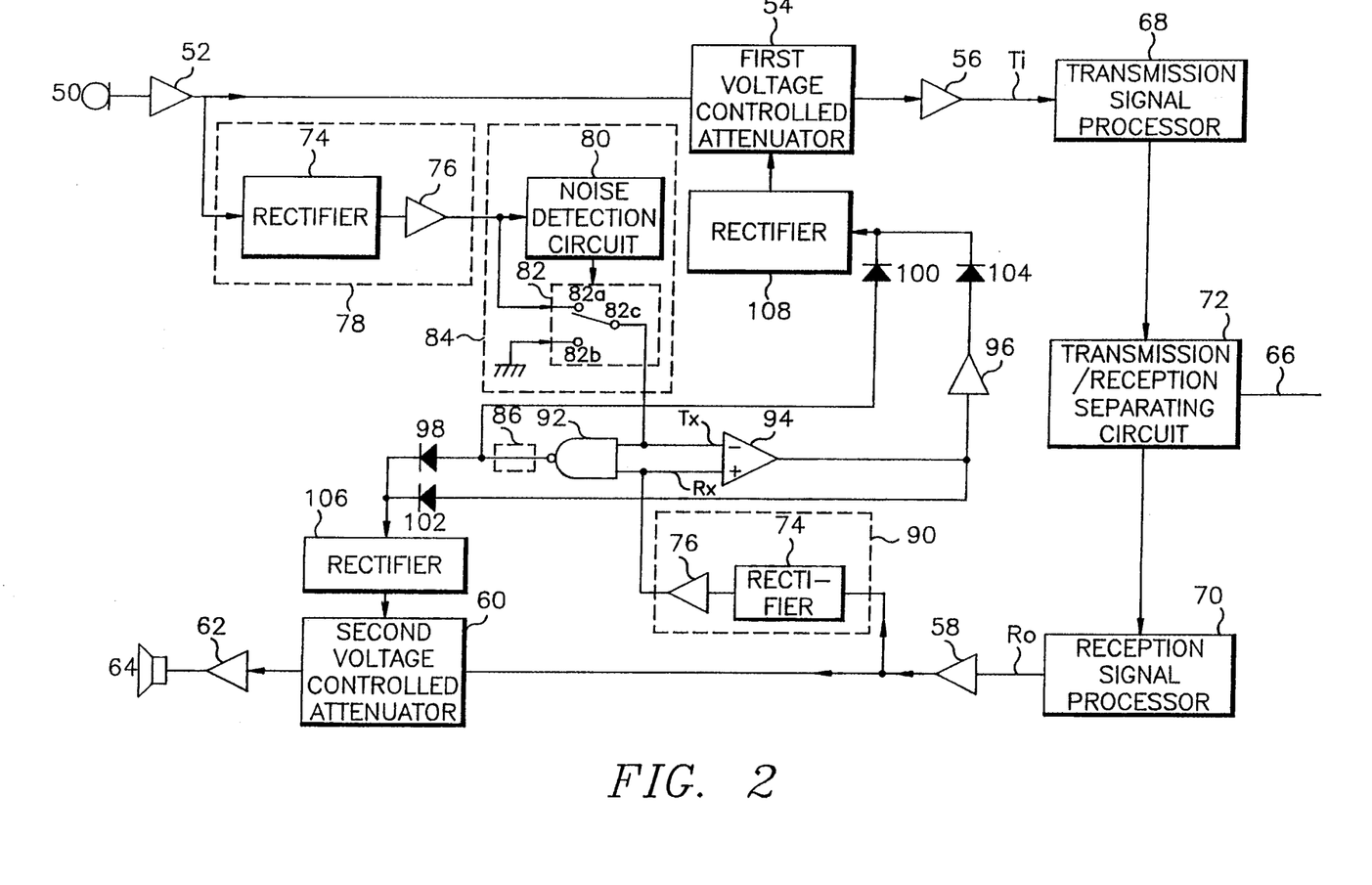
FIG. 2 shows a hands-free control circuit of the inventive radio and land-line telephones.

Referring to FIG. 2, there is described a circuit of the inventive hands-free radio and land-line telephones as follows. A microphone 50 is to convert an audio signal into an electric signal. A speaker 64 is to convert an electric signal into an audio signal. A public telecommunication network connection part is installed between a public telecommunication network connection terminal 66, a reception signal output terminal Ro and a transmission signal input terminal Ti to transmit a transmission signal from the input terminal Ti to the connection terminal 66 and a reception signal from the connection terminal 66 to the output terminal Ro. A first voltage controlled attenuator 54 is installed between the microphone 50 and the transmission signal input terminal Ti to control an output of the microphone 50 by an attenuation loss corresponding to a first control voltage level. A second voltage controlled attenuator 60 is installed between the speaker 64 and the reception signal output terminal Ro to control an output of the reception signal by an attenuation gain corresponding to a second control voltage level. A first detection circuit 78 is to generate a rectified voltage proportional to a magnitude of an input audio signal by rectifying an output signal of the microphone 50. A noise gain control part 84 comprises of a first output path for receiving and transmitting an output of the first detection circuit 78, a noise detection circuit 80 for detecting the continuous noise in the transmission signal, and a switch for switching an output of the first output path into a first binary state (low voltage) when detecting a noise. A second detection circuit 90 is to generate a rectified voltage proportional to a magnitude of an input audio signal by rectifying a signal from the reception signal output terminal Ro. An operational amplifier 94 is to generate a first control signal smaller than a given voltage in case of an output of the first path being larger than an output of the second detection circuit 90 and vice versa, larger than the given voltage in case of an output of the first path being smaller than an output of the second detection circuit 90, by comparing and amplifying the outputs of the first output path of the noise gain control part 84 and the second detection circuit 90. An inverting amplifier 96 is to invert and amplify an output of the operational amplifier 94. A NAND gate 92 is to generate a first control signal of a first binary state (low voltage) for preventing howling in case of both outputs of the first path of the noise gain control part 84 and the second detection circuit 90 are larger than a given voltage, and a second control signal of a second binary state (high voltage) in case of one of said two outputs being smaller than a given voltage. A plurality of diodes 100, 104, 98, 102 and rectifiers 108, 106 are to supply the outputs of the gate 92 and the inverting amplifier 96 as first and second control voltages for the first and the second voltage controlled attenuators 54, 60 respectively. The reference number 86 in FIG. 2 is a voltage divider for generating an output by dividing an output of a NAND gate 92 into a certain level. The reference numbers 52, 56, 58 and 62 are amplifiers to amplify each input signal thereof by a certain level. Each one of the first and the second detection circuits 78, 90 comprises a rectifier 74 for making a high speed response in case of an input signal being present and a low speed response in case of an input signal being blocked, and a buffer 76 for driving an output of the rectifier 74. The noise gain control part 84 comprises a noise detection circuit 80 to generate a second binary state (high voltage) signal by detecting a continuous noise of an output from the buffer 76 of the first detection circuit 78, a first path to supply an output from the buffer 76 of the first detection circuit 78 to one side of the NAND gate 92, and a switch 82 to switch on a first binary state signal by cutting off the first path when the noise detection circuit 80 generates a second binary state signal. The public telecommunication network connection part comprises a transmission signal processor 68 to modulate the transmission signal from the input terminal Ti, a transmission/reception separator circuit (duplexer) 72 to transmit an output from the transmission signal processor 68 to the public telecommunication network connection terminal 66 and to separate the reception signal from the connection terminal 66, and a reception signal processor 70 to demodulate the reception signal from the transmission/reception separator circuit 72 and transmit the resultant signal to the reception signal output terminal Ro.

Figure 3A:
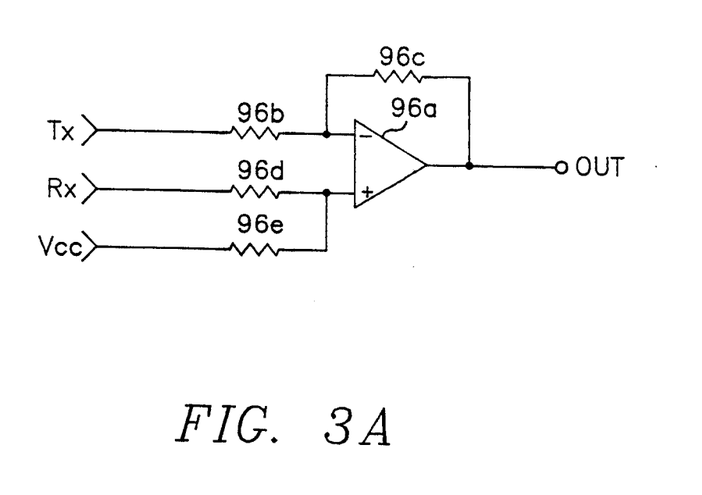
FIGS. 3A, 3B, and 3C show schematic diagrams of an operational amplifier, an inverting amplifier, a first and a second detection circuits.
Figure 3B:
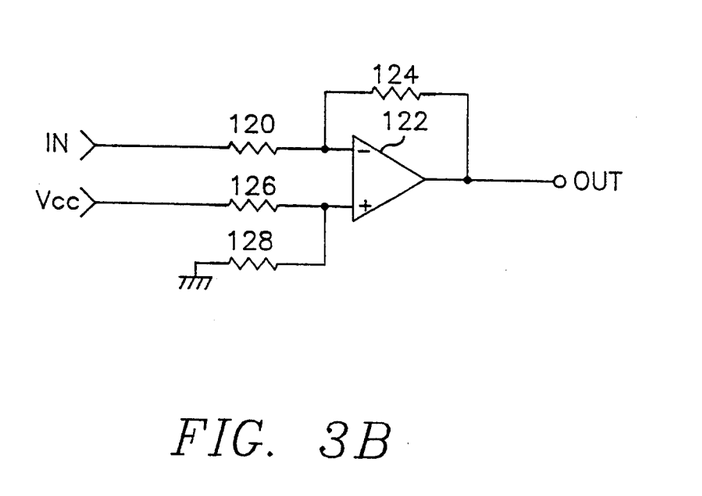
Figure 3C:
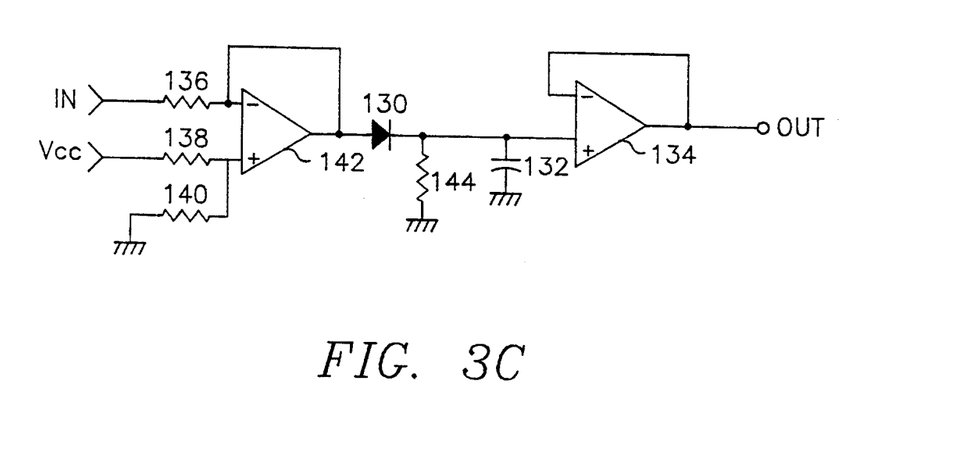

FIGS. 3A, 3B and 3C are schematic diagrams of the operational amplifier 94, the inverting amplifier 96, and the first and the second detection circuits 78, 90 as shown in FIG. 2.

Figure 4:
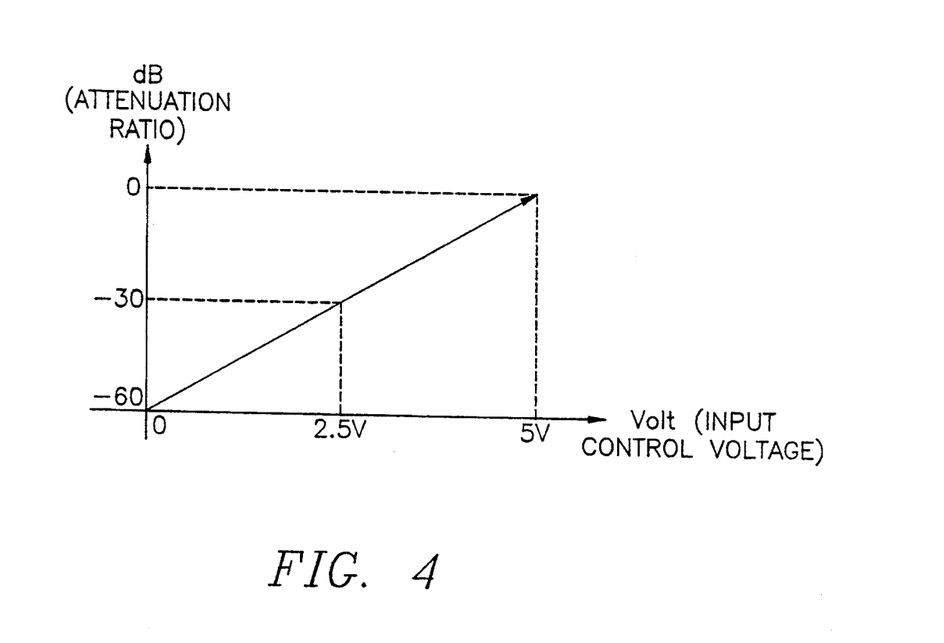
FIG. 4 shows a characteristic diagram of a voltage controlled attenuator in operation.

FIG. 4 is a characteristic diagram of the first and the second voltage controlled attenuators 54, 60, wherein an attenuation rate is 0 dB at a high voltage (5 V) of an input control voltage and −60 dB at a low voltage (0 V) of the input control voltage. So an attenuation gain is controlled between 0 dB and −60 dB by the input control voltage.

With reference to FIGS 3A, 3B, 3C and 4, the operation of the inventive circuit shown in FIG. 2 is described as follows. When an audio signal is applied to a microphone 50, the microphone converts an input audio signal into an electric signal. The electric signal from the microphone 50 is amplified to a given level of gain by an amplifier 52 and transmitted to a rectifier 74 of a first detection circuit 78 and to a first voltage controlled attenuator 54. The first voltage controlled attenuator 54 attenuates the transmission audio signal by a gain corresponding to an input control voltage and transmits the resultant signal to an amplifier 56. And then, the signal is amplified to a certain level by the amplifier 56 and transmitted to a connection terminal 66 of a public telecommunication network through a transmission signal processor 68 and a transmission reception separating circuit 72. The rectifier 74 of the first detection circuit 78 rectifies the output signal of the microphone 50 and transmits it to a noise detection circuit 80 and one terminal 82A of a switch 82 through a buffer 76 connected thereto. As shown in FIG. 3C, the rectifier 74 of the first detection circuit 78 comprises signal input resistors 136, 138, 140, an operational amplifier 142, a diode 130, a resistor 144 and a capacitor 132, and detects the presence of an input signal, with a rising characteristic of 1 msec and a falling characteristic of 200 msec. Accordingly, the rectifier 74 transmits a rectified voltage signal to the buffer 76 with a high speed response of 1 msec in case of the presence of an input audio signal, and with the falling characteristic of 200 msec in case of the absence of an input audio signal. The buffer 76 transmits the input signal from the rectifier 74 to a noise detection circuit 80 and one terminal 82a of the switch 82 is to be activated by an output of the noise detection circuit 80. Generally an audio signal has a feature of a sporadic signal and an environmental noise has a feature of continuous signal. So the noise detection circuit 80 activates the switch 82 by discriminating the environmental noises with the feature of continuous signal. The switch 82 is switched to generate a low DC voltage by a control of the noise detection circuit 80 in the presence of an environmental noise. When the noise detection circuit 80 generates the control signal of a second binary state (high voltage level, for example, 5 V) in the case of the transmission signal from the buffer 76 carrying a noise, the switch 82 connects a terminal 82b with a terminal 82C in response to the control signal of the second binary state. The switch 82 transmits the first binary state (low voltage) of the terminal 82b in the case of the output of the microphone 50 including a noise, and transmits the output of the buffer 76 to a NAND gate 92 and an inversion terminal (−) of an operational amplifier 94 in the case of no noise. On the other hand, a reception signal from a public telecommunication network connection terminal 66 is transmitted to an amplifier 58 through a reception signal processor 70, and the amplifier 58 transmits the signal to a second voltage controlled attenuator 60 and a rectifier 74 of a second detection circuit 90 after amplifying it by certain level. The second voltage controlled attenuator 60 attenuates the output signal of the amplifier 58 by a given gain corresponding to an input control voltage and transmits the resultant signal to a speaker 64 through an amplifier 62. A second detection circuit 90 receiving the reception signal through the amplifier 58 is operated the same as the first detection circuit 78. In the presence of the reception signal, the second detection circuit 90 rectifies the reception signal and transmits a rectified voltage of a given level to the NAND gate 92 and a non-inverting terminal (+) of the operational amplifier 94, with a rising characteristic of 1 msec and a falling characteristic of 200 msec. The NAND gate 92 processes the outputs of the switch 82 and the second detection circuit 90 and thereby generates a first binary state signal and/or a second binary state signal and transmits it to a voltage divider circuit 86. In a general case, the output of the NAND gate 92 is a second binary state (high voltage level). But it has a first binary state signal when both inputs thereof are a second binary state (high voltage) owing to a howling making the reception and transmission signals large. The general case mentioned above is that when the transmission signal of the microphone includes noise, only one of the reception and the transmission signals is transmitted, or one of two inputs of the reception and the transmission signals transmitted to the NAND gate 92 has a first binary state. Accordingly the NAND gate 92 generates a first binary state (low voltage) in case of both transmission Tx and reception Rx signals being large, and so the signal transmitted through a voltage dividing circuit 86, diodes 98, 100 and rectifiers 106, 108 to the first and second voltage controlled attenuators 54, 60 respectively becomes nearly 0 volts. An input signal of 0 volts makes the first and the second voltage controlled attenuators 54, 60 have an attenuation rate of −60 dB (as shown in FIG. 4) to thereby prevent the howling. In case of an output of the NAND gate being a second binary state (high voltage 5 V), the output is divided at about 3 volts by the voltage dividing circuit 86 and transmitted through diodes 100, 98 and rectifiers 108, 106. Consequently the first and the second voltage controlled attenuators 54, 60 have an attenuation of about −20 dB as shown in FIG. 4. The operational amplifier 94 compares linearly the signal from the switch 82 and the signal from the second detection circuit 90 and transmits resultant signals to a diode 102 and an inverting amplifier 96. The output level of the operational amplifier 94 is lower than a given voltage when the transmission signal Tx is larger than the reception signal Rx and vice versa. The output signal of the operational amplifier 94 is transmitted to the second voltage controlled attenuator 60 through the diode 102 and the rectifier 106, and transmitted to the first voltage controlled attenuator 54 through the inverting amplifier 96, the diode 104 and the rectifier 108. According to the output level of the NAND gate 92 and the operational amplifier 94, one of the first and the second voltage controlled attenuators 54, 60 performs the maximum attenuation when the other one has no attenuation, and thus the sum of attenuation of both attenuators is maintained consistently at a given level to thereby keep the performance of the hands-free system in good condition.

As described above, this invention is to provide a full duplex and hands-free system of land-line and radio telephones, wherein an intermittent syllable is controlled by voltage controlled attenuators controlling gain of transmission and reception paths according to an input control voltage thereof and controlling an attenuation rate of the voltage controlled attenuators by detecting a noise, and transmission and reception signals.

While the invention has been particularly shown and described with reference to the preferred embodiment of the present invention thereof, it will be understood by those skilled in the art that the foregoing and other changes in form and details may be made without departing from the spirit and scope of the present invention.

What is claimed is:

1. A hands-free telephone comprising:
   a microphone for converting an input audio signal into an electric signal;
   a speaker for converting an electric signal into an output audio signal;
   a public telecommunication network connection part installed between a public telecommunication network connection terminal, a transmission signal input terminal and a reception signal output terminal to transmit a transmission signal from said transmission signal input terminal to said public telecommunication network connection terminal, and a reception signal from said public telecommunication network connection terminal to said reception signal output terminal;
   a first voltage controlled attenuator installed between said microphone and said transmission signal input terminal to control an output of said microphone by a given gain corresponding to a level of a first control voltage;
   a second voltage controlled attenuator installed between said speaker and said reception signal output terminal to control the reception signal by a given gain corresponding to a level of second control voltage;
   a first detection circuit for rectifying said output of said microphone to generate a rectified voltage proportional to a magnitude of said input audio signal;
   a first output path for providing a first output signal exhibiting a plurality of states determined by said rectified voltage from said first direction circuit;
   a second detection circuit for rectifying said reception signal to generate a rectified voltage proportional to a magnitude of said reception signal;
   control voltage output means for comparing and amplifying outputs of said first detection circuit and said second detection circuit corresponding to a difference between said transmission signal and said reception signal, to generate a gradient voltage smaller than a given voltage in case of said transmission signal being larger than said reception signal and to generate a gradient voltage larger than said given voltage in case of said transmission signal being smaller than said reception signal, and for applying said gradient voltage to said second voltage controlled attenuator as said second control voltage;
   a gate for applying a control signal of a first one of said plurality of states to said first and second voltage controlled attenuators when both outputs of said first output path and said second detection circuit exhibit a same one of said plurality of states: and
   an inverting amplifier coupled between an output port of said control voltage output means and said first voltage controlled attenuator, for inverting said control signal transmitted to said first voltage controlled attenuator so that the attenuation rate of said first and second voltage controlled attenuators are controlled automatically according to the amount of the difference between said transmission signal and said reception signal.

2. The hands-free telephone of claim 1, wherein a response characteristic of said first and second detection circuits has a rise time of about one millisecond and a fall time of about 200 milliseconds.

3. The hands-free telephone of claim 1, further comprising:
   a noise detection circuit for detecting noise from said rectified voltage of said first detection circuit; and
   a switch for switching said first output signal into between said plurality of states in dependence upon detection of noise by said noise detection circuit, to control attenuation of said first voltage controlled attenuator.

4. The hands-free telephone of claim 1, wherein each of said first and second detection circuits comprises:
   a rectifier for responding in high speed with a rise time of at least one millisecond when the corresponding one of said electrical signal and said reception signal is present, and in low speed with a fall time of about 200 millisecond when the corresponding one of said electrical signal and said reception signal is interrupted; and
   a buffer for driving an output of said rectifier.

5. The hands-free telephone of claim 1, further comprising noise gain control means comprising:
   a noise detection circuit for generating a detection signal representative of a presence of continuous noise from the output of said first detection circuit,
   said first output path transmitting said rectified voltage output of said first detection circuit to said noise detection circuit, and
   a switch for switching said first output signal between said plurality of states in response to said detection signal from said noise detection circuit.

6. The hands-free telephone of claim 5, wherein each of said first and second detection circuits comprises:

a rectifier for responding in high speed with a rise time of at least one millisecond when the corresponding one of said electrical signal and said reception signal is present, and in low speed with a fall time of about 200 millisecond corresponding one of said electrical signal and said reception signal is interrupted; and a buffer for driving an output of said rectifier.

7. A hands-free telephone for transmitting a transmission signal and receiving a reception signal, comprising:

first voltage controlled attenuation means for attenuating an audio input signal in response to a first control voltage signal to generate said transmission signal;

second voltage controlled attenuation means for attenuating said reception signal in response to a second control voltage signal to generate an audio output signal;

first detection means for detecting and rectifying said audio input signal to generate a first rectified voltage signal;

second detection means for detecting and rectifying said reception signal to generate a second rectified voltage signal;

control voltage output means for comparing said first and second rectified voltage signals to generate said first and second voltage control signals, with said first and second voltage control signals based on a difference between said first and second rectified voltage signals and being complementary to each other;

rectifying means for rectifying said first voltage control signal and said second voltage control signal received from said control voltage output means; and means for generating third and fourth voltage control signals having a first state in response to said first and second rectified voltage signals having a second state, said third and fourth voltage control signals being combined with said first and second voltage control signals to control attenuation of said audio signal and said reception signal.

8. The hands-free telephone of claim 7, further comprising:

noise gain control means for detecting a continuous noise accompanied with said first rectified voltage signal and for allowing transmission of said first rectified voltage signal when said continuous noise is not detected.

9. The hands-free telephone of claim 8, wherein said noise gain control means comprises:

noise detection circuit for detecting said continuous noise and generating a noise control signal in dependence upon detection of said continuous noise; and switch means for alternately enabling transmission of said first rectified voltage signal and a first potential in dependence upon said noise control signal.

10. The hands-free telephone of claim 7, wherein each of said first and second detection means has a rise time of about one millisecond and a fall time of about 200 milliseconds.

11. The hands-free telephone of claim 7, wherein the sum of attenuation of said first and second voltage controlled attenuation means is maintained at a substantially given level during operation, and each of said first and second voltage controlled attenuation means has a linear slope characteristic for respectively controlling voltages of the audio input signal and the reception signal.

12. The hands-free telephone of claim 7, wherein the sum of attenuation of said first and second voltage controlled attenuation means is maintained at a substantially given level during operation.

13. The hands-free telephone of claim 7, wherein said first detection means comprises:

a first operational amplifier for receiving said audio input signal and a source, potential, and having an inverting terminal connected to an output terminal of said first operational amplifier;

a diode having a first terminal connected to said output terminal of said first operational amplifier; and a second operational amplifier connected to said first operational amplifier via a second terminal of said diode, and having an inverting terminal connected to an output terminal of said second operational amplifier.

14. The hands-free telephone of claim 7, wherein:

said first detection means comprises:
a rectifier for rectifying said audio input signal; and
a buffer amplifier for providing said first rectified voltage signal by amplifying an output of said rectifier; and said second detection means comprises:
a rectifier for rectifying said reception signal; and
a buffer amplifier for providing said second rectified voltage signal by amplifying an output of said rectifier.

15. The hands-free telephone of claim 7, wherein said control voltage output means comprises:

an operational amplifier for comparing said first and second rectified voltage signals to produce said second control voltage signal; and inverting means for inverting said second control voltage signal to produce said first control voltage signal.

16. The hands-free telephone of claim 15, further comprising:

a voltage divider for dividing an amplitude of said third and fourth voltage control signals.

17. The hands-free telephone of claim 7, wherein each of said first and second voltage controlled attenuation means has an attenuation range between about 0 decibels and −60 decibels.

18. A hands-free telephone system, comprising:

a microphone, responsive to audible sounds, for converting the audible sounds into first electrical signals;

a speaker, responsive to controlled second electrical signals, for converting the second electrical signals into audible sounds;

first attenuator means for controlling attenuation of said first electrical signals along a linear slope characteristic in dependence upon a first voltage control signal to generate transmission signals;

means, connected to communication lines, for transmitting said transmission signals to communication lines and receiving reception signals from the communication lines;

second attenuator means for controlling attenuation of said reception signals along a linear slope characteristic in dependence upon a second voltage control signal to generate said second electrical signals;

first detector means for detecting and rectifying said first electrical signals from said microphone to generate a first detected signal having a first voltage proportional to a magnitude of said first electrical signals;

second detector means for detecting and rectifying said reception signals to generate a second detected signal having a second voltage proportional to a magnitude of said reception signals;

noise detector means for generating a resultant signal by enabling transmission of one of a third voltage and said first detected signal having said first voltage, in dependence upon detection of noise from said first detected signal; and voltage control generator means for generating said first and second voltage control signals to control attenuation of said first electrical signals from said microphone and said reception signals to said speaker, in dependence upon a comparison of said resultant signal and said second detected signal.

19. A hands-free telephone system, comprising:

microphone, responsive to audible sounds, for converting the audible sounds into first electrical signals:

a speaker, responsive to second electrical signals, for converting the second electrical signals into audible sounds;

first attenuator means for controlling attenuation of said first electrical signals from said microphone in dependence upon a first voltage control signal to generate transmission signals;

means, connected to communication lines, for transmitting said transmission signals to communication lines and receiving reception signals from the communication lines;

second attenuator means for controlling attenuation of said reception signals to said speaker in dependence upon a second voltage control signal to generate said second electrical signals;

first detector means for detecting and rectifying said first electrical signals to generate a first detected signal having a first voltage proportional to a magnitude of said first electrical signals;

second detector means for detecting and rectifying said reception signals to generate a second detected signal having a second voltage proportional to a magnitude of said reception signals;

noise detector means for generating resultant a signal by enabling transmission of one of a third voltage and said first detected signal exhibiting said first voltage, in dependence upon detection of noise from said first detected signal: and voltage control generator means for generating said first and second voltage control signals to control attenuation of said first electrical signals from said microphone and said reception signals to said speaker, in dependence upon a comparison of said resultant signal and said second detected signal:

said voltage control generator means comprising:

means for logically combining said resultant signal and said second detected signal to generate a logic signal;

means for comparing said resultant signal and said second detected signal having said second voltage to generate a compared signal;

means for inverting said compared signal to generate an inverted signal;

means for generating a first combined signal by combining said inverted signal and said logic signal, and for rectifying the first combined signal to generate said first voltage control signal for controlling attenuation of said first electrical signals from said microphone; and means for generating a second combined signal by combining said compared signal and said logic signal and rectifying the second combined signal to generate said second voltage control signal for controlling attenuation of said reception signals to said speaker.

20. The hands-free telephone system of claim 19, wherein said noise detector means comprises:

means for detecting continuous noise from said first detected signal to generate a noise control signal in dependence upon said detection; and means for alternately enabling transmission of said first detected signal having said first voltage and said third voltage in dependence upon logic states of said noise control signal.

21. The hands-free telephone system of claim 19, wherein:

said first detector means comprises:
a rectifier for rectifying said electrical signals; and
a buffer amplifier for providing said first detected signal having said first voltage by amplifying the output of said rectifier; and said second detection means comprises:
a rectifier for rectifying said reception signal; and
a buffer amplifier for providing said second detected signal having said second voltage by amplifying the output of said rectifier.

22. The hands-free telephone system of claim 19, wherein each of said first and second detector means has a rise time of about 1 millisecond and a fall time of about 20 milliseconds, and each of said first and second attenuator means has an attenuation range between about 0 decibels and −60 decibels.

23. The hands-free telephone system of claim 19, wherein each of said first and second attenuator means has a linear slope characteristic for controlling voltages of said electrical signals from said microphone and said reception signals to said speaker.

24. A hands-free telephone system, comprising:

microphone, responsive to audible sounds, for converting the audible sounds into first electrical signals:

a speaker, responsive to second electrical signals, for converting the second electrical signals into audible sounds:

first attenuator means for controlling attenuation of said first electrical signals from said microphone in dependence upon a first voltage control signal to generate transmission signals:

means, connected to communication lines, for transmitting said transmitting said transmission signals to the communication lines and receiving reception signals from the communication lines;

second attenuator means for controlling attenuation of said reception signals to said speaker in dependence upon a second voltage control signal to generate said second electrical signals:

first detector means for detecting and rectifying said first electrical signals to generate a first detected signal having a first voltage proportional to a magnitude of said electrical signals;

second detector means for detecting and rectifying said reception signals to generate a second detected signal having a second voltage proportional to a magnitude of said reception signals;

noise detector means for generating a resultant signal by enabling transmission of one of a third voltage and said first detected signal exhibiting said first voltage, in dependence upon detection of noise from said first detected signal; and voltage control generator means for generating said first and second voltage control signals to control attenuation of said first electrical signals from said microphone and said reception signals to said speaker in dependence upon a comparison of said resultant signal and said second detected signal;

said voltage control generator means comprising:

a NAND gate for logically combining said resultant signal and said second detected signal to generate a first operational signal;

an operational amplifier for comparing said resultant signal and said second detected signal having said second voltage to generate a second operational signal;

an inverter for inverting said second control signal to generate an inverted signal;

a first diode interposed between said inverter and said first attenuator means;

a second diode interposed between said gate and said second attenuator means;

a third diode interposed to convey said first operational signal to said first attenuator means; and a fourth diode interposed to convey said second operational signal to said second attenuator means;

a first rectifier for rectifying said inverted signal and said first operational signal via said third diode to generate said first voltage control signal for controlling attenuation of said electrical signals from said microphone; and a second rectifier for rectifying said first operational signal and said second operational signal via said fourth diode to generate said second voltage control signal for controlling attenuation of said reception signals to said speaker.

25. The hands-free telephone system of claim 24, wherein a voltage of said second control signal is lower than a given voltage when the resultant signal is larger than the second detected signal, and larger than said given voltage when the resultant signal is smaller than the second detected signal.

26. The hands-free telephone system of claim 24, wherein the sum of attenuation of said first and second attenuator means is maintained substantially at a given level during operation, and each of said first and second attenuator means has a linear slope characteristic ranging from −60 decibels to 0 decibels.

* * * * *

UNITED STATES PATENT AND TRADEMARK OFFICE
CERTIFICATE OF CORRECTION

PATENT NO. : 5,396,550
DATED : March 7, 1995
INVENTOR(S) : Kyoung-Jun KIM

It is certified that error appears in the above-indentified patent and that said Letters Patent is hereby corrected as shown below:

Column 4,    line 28,    before " a ", delete "of";

IN THE CLAIMS

Column 7,    line 60,    before "second", insert -- a --;

Column 11,    line 20,    before "microphone", insert -- a --;

line 46,    before "resultant", insert -- a --, and                         after "resultant", delete " a ";

Column 12,    line 43,    before "microphone", insert -- a --:

Signed and Sealed this

Third Day of September, 1996

Attest:

BRUCE LEHMAN

Attesting Officer    Commissioner of Patents and Trademarks